Dec. 24, 1946.  E. A. ANDERSON  2,413,132
ADJUSTABLE OPERATING HANDLE FOR STEERING WHEELS
Filed Dec. 9, 1944

INVENTOR.
Einar A. Anderson
BY
Attorney

UNITED STATES PATENT OFFICE

2,413,132
ADJUSTABLE OPERATING HANDLE FOR STEERING WHEELS

Einar A. Anderson, Minneapolis, Minn.

Application December 9, 1944, Serial No. 567,357

2 Claims. (Cl. 74—557)

My invention relates to an adjustable operating handle for steering wheels and has for its object to provide such a handle which may have an erect position when in use but which may be normally swung below the plane of the steering wheel when not in use.

In operating an ordinary steering wheel for automobiles, trucks or the like, the hands grip the arcuate sides of the steering wheel and as the wheel is turned the grip will be twisted and the actual leverage will tend to be reduced, making it difficult to steer even with both hands on the steering wheel and impractical to steer safely with one hand. This is due to the fact that with the hands on the steering wheel the turning movement effected by the muscles is not directly in the plane of the large muscles which hinge the arm at the elbow, but is indirect and varies in position, greatly reducing the effectiveness of muscular exertion applied, and proving far more tiring than where the normal hinge movement at the elbow is employed.

Means have been employed to mount upon the top of the arcuate extension of the steering wheel a pin support extending at right angles to the plane of the steering wheel and upon this pin support to mount a rotatable handle member adapted to fit into the palm of the hand and to permit the steering wheel to be turned to any desired degree, even to a complete revolution by the use of one hand. However, such an upstanding member catches on arms and clothing, is unsightly, and frequently is in the way for normal steering operation. For such a specialized handle is not designed for continuous use but is temporarily used during backing movements, in parking a car, or in taking a car out of the garage, or in making short turns at slow speed around very sharp curves, or the like. At other times, for straightaway driving or driving along very broad curves, direct hand hold of the steering wheel itself is sufficient.

Such a handle structure has also been obtained by mounting a rotatable handle on a bracket which is clamped to the steering wheel so that the rotatable handle will extend to the inside of the steering wheel permanently positioned in that manner at a point radially closer to the center of rotation of the wheel than is the wheel rim. While this arrangement takes the handle below the outer plane of the top of the steering wheel, it has a serious disadvantage in that the radius for leverage is substantially shortened, so that the added power required to turn the wheel with this shorter leverage more than offsets any advantage which may come from the permanent mounting of the member within the planes of a steering wheel rim.

I have discovered that if the upstanding handle or knob is so mounted on the steering wheel that it can be swung from its upright position to a position in the plane of the steering wheel extending radially inwardly toward the axis of the steering wheel, and yet so mounted that it may be readily swung upward into operative position and will have firm operative connection with the steering wheel rim, all the advantages of a rigidly attached hand hold will be obtained and all the disadvantages of a fixed knob permanently mounted to extend upwardly from the plane of the steering wheel will be avoided.

Also there will be avoided the serious defect of shortened leverage and consequent loss of power inherent in mounting a handle knob in fixed position within the planes of the steering wheel rim.

It is a principal object of my invention, therefore, to provide as an adjunct of the steering wheel of an automobile, either adapted for removable application thereto or permanently built into the steering wheel by the manufacturer, a mounting for a hand hold knob which will have firm operative connection with the steering wheel and yet which may be quickly and easily shifted from its upright operative position to an out-of-the-way position within the planes of the steering wheel rim.

It is a further important object of my invention to provide a supporting member arcuate in cross-section adapted to be rigidly secured upon a steering wheel which is formed with a semicircular guide rib, to provide a complementary arcuate support member having grooves cooperating with the parts of said guide rib and to mount on this support member a rotatable handle structure rigidly connected with the support member and extending radially from the center of the arcs of the aforesaid guide rib and support member so that it may be swung in the arc of a circle about the arcuate center of the steering wheel rim from its upright position to be positioned at one side of the steering wheel rim and to extend radially inwardly therefrom.

It is a further object of my invention to provide the arcuate guide rib with laterally projecting arcuate individual ribs and with arcuate grooves on the insides of said ribs, and to provide the handle-supporting member with arcuately curved fingers at the sides thereof having their inwardly turned portions adapted to seat within said grooves.

It is a further object of my invention to provide on the handle support a removable pin rigidly connected therewith extending radially and to mount as upon a pintle or a spindle a handle member, adapted to seat in the palm of the hand, which is freely rotatable about a substantially vertical axis through the axis of the pin.

It is a further object of my invention to block the ends of the guide grooves for limiting movement of the handle carrier thereon, at least one of said blocking pieces being removable to permit application of the carrier to and withdrawal of it from said grooves.

It is a further object of my invention to provide clip means at the ends of the grooved guide which cooperate with depressed seats on the oscillatable carrier to hold the carrier against accidental displacement from its operative or its inoperative positions but which will permit ready manual shifting thereof.

The full objects and advantages of my invention will be given in more or less detail in the specification which is appended hereto and the novel features by which the advantageous results coming from the use of this invention are obtained will be particularly pointed out in the claims.

In the drawing illustrating an application of my invention in some of its forms:

Figure 5:
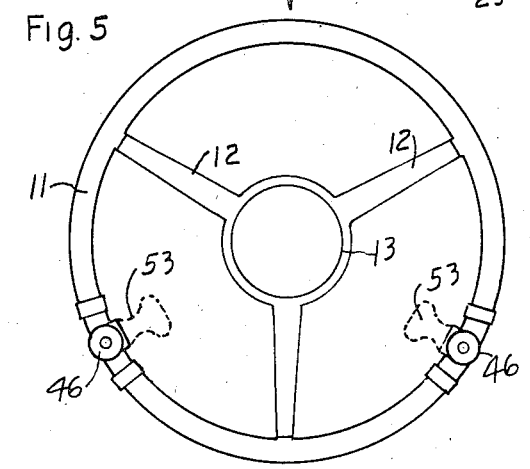
Fig. 5 is a plan view of a steering wheel showing a pair of devices of the invention exemplified in the device of Fig. 1 removably attached thereto.
Figure 6:
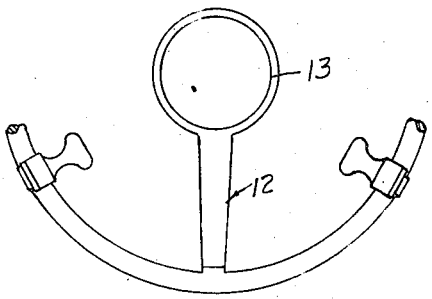
Fig. 6 is a similar view of a steering wheel showing the invention permanently united with the steering wheel rim by being built into it at the factory where the automobile or other steerable device and the steering wheel applied thereto is constructed.

As shown in Figs. 5 and 6, a steering wheel 10 has a customary wheel rim 11 which is connected by spokes 12 in a usual manner with a steering wheel hub 13.

Figure 1:
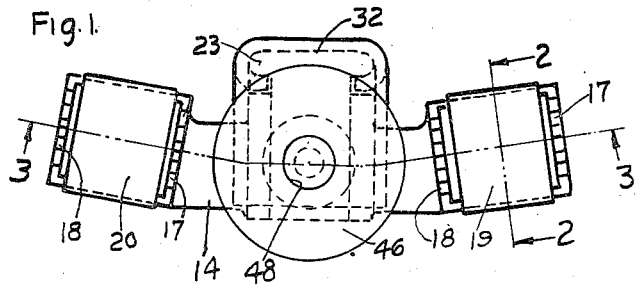
Fig. 1 is a top plan view of an embodiment of the invention which is adapted to be applied to the steering wheel of an automobile or other steerable device in use.
Figure 2:
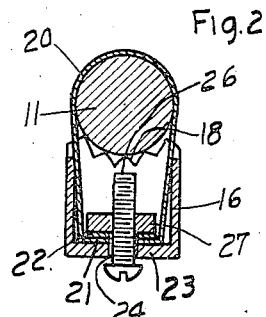
Fig. 2 is a transverse sectional view taken on line 2—2 of Fig. 1.

In the form of my invention shown in Figs. 1 and 2, a central frame member 14 has secured thereto a pair of cup-like members 15 and 16 each having oppositely positioned serrated edges 17 and 18. Seated in the respective cup-like members are hasp-like metal loops 19 and 20, which have their respective ends 21 and 22 overlapped.

As best shown in Fig. 2, the hasps are adapted to be spread apart and positioned about the rim 11 of the steering wheel with their overlapping edges at the bottom 23 of the cup-like members 15 and 16. Through an opening 24 in the bottom 23 and similar openings through the overlapping parts 21 and 22 of the hasp-like members 19 and 20 extends a screw bolt 25 which engages with its end 26 the outer surface of the wheel rim 11 and which is threaded through a nut 27 having a shape to hold it from turning inside of the cup-like members 16 and 17.

Upon the frame piece 14 is rigidly secured a member 28 which is in the form of substantially a three-quarter circle. This member has formed about its sides a pair of annular grooves 29 and 30, Fig. 3, which set off a guide table 31 having a flat arcuate top 32 with arcuate ears 33 and 34 overlying the grooves 29 and 30. The member 28 is thus rigidly attached to the frame bar 14, in fact normally is integrally a part of it, and will be removably held in position upon the steering wheel rim 11 by means of the securing means including the screw bolt 25, the nut 27 and the respective loops 19 and 20.

Removably secured upon the end 35 of the arcuate guide member 28 is a piece 36 having spring fingers 37 thereon adapted for a latching engagement hereinafter described. The other end 38 of the arcuate member 28 is also provided with a part 39 closing the ends of grooves 29 and 30 and extending outwardly at 40, to which outward extension are secured spring fingers 41 for a purpose hereinafter to be described.

Figure 3:
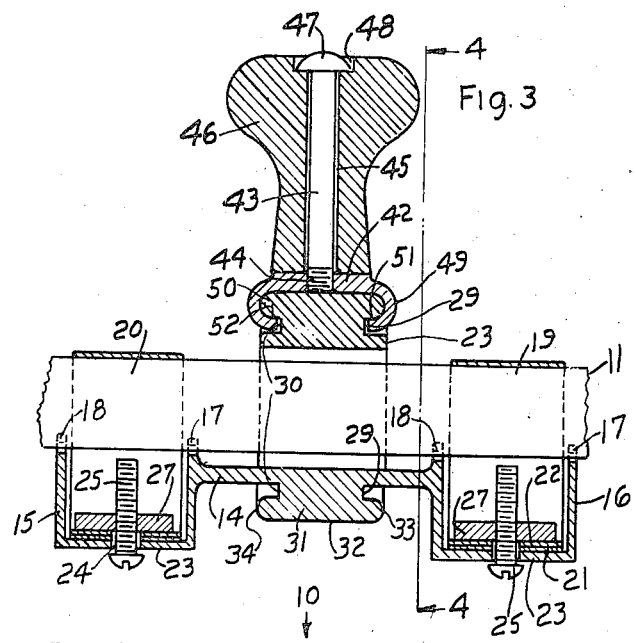
Fig. 3 is a longitudinal sectional view taken on line 3—3 of Fig. 1.

As best shown in Fig. 3, an arcuate base 42 is adapted to receive a pintle 43 threaded at 44 into the base 42. The pintle 43 will be caused to extend through an opening 45 in a handle member 46 and to be threaded into the arcuate base 42 at 44, as above described. The pintle 43 has a head 47 which will preferably be countersunk into the top of handle member 46, as indicated at 48. The handle 46 is thus mounted for free rotation about the axial center of pintle 43.

Upon the outer edges of the arcuate base member 42 are formed flanges 49 and 50 which are semi-circular in cross-section and have their edges 51 and 52 adapted to be positioned in the arcuate channels or grooves 29 and 30. These edges 51 and 52 and the transversely curved flanges 49 and 50 are curved longitudinally in arcs the same as the curvature of the channels 29 and 30 and the flanges 33 and 34. Hence, the member 43 taken as an entirety and carrying with it the palm-fitting rotatable handle 46 can be moved along in the arc of a circle having its center at substantially the longitudinal center of the steering wheel rim 47 from the position in full lines on Figs. 5 and 6 to the position indicated in dotted lines at 53 in Fig. 5.

Figure 4:
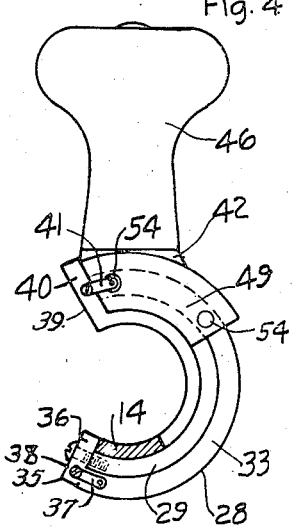
Fig. 4 is a sectional elevation view taken on line 4—4 of Fig. 3.

In assembling this member upon the arcuate supporting member 28 it is only necessary to withdraw the piece 36 and position the member made up of the parts 42, 49, 50, and 51, 52 together until the handle 46 comes into its erect position, as indicated in Figs. 3 and 4. The fingers 41 will then snap into depressions 54 at the sides of flanges 49 and 50 and hold it in its erect position so that it will not easily be displaced but so that some degree of force must be manually exercised to move it from its upright position to its dotted line position, as indicated in Fig. 5.

As shown in Fig. 6, the base member 14 may be rigidly and permanently connected with the steering wheel rim. This would be done at the factory where the steering wheel is made and thus be installed upon an automobile as the same is sold new. When so permanently installed the handle may be swung from inoperative to operative position and in reverse order with the same ease and efficiency as is true of the member adapted to be removably attached to the steering wheel rim.

The advantages of my invention have been pointed out with a degree of clarity in the foregoing specification. A fundamental advantage is that in a very simple structure which is inexpensive to build and to install, the rotatable palm-contactable handle may be carried into operative position for use when needed and thereafter swung from operative to inoperative position with the utmost ease and dispatch.

It is also a very marked advantage of this invention that it is applicable to the steering wheels of automobiles, speed boats and the like, which have already been constructed and yet that it is well adapted to be installed on such steering wheels at the time of the manufacture of the automobile or vehicle to which it is attached.

A further great advantage is that the knob or palm-contacting handle will under normal working conditions be held in upright operative position or in the swung position inside of the steering wheel rim with no liability to get out of that position or to rattle or chatter.

A further great advantage of my invention is that when the palm-contacted rotatable handle is in its erect or operative position, that position is directly over the annular center line of the steering wheel rim. Hence, the leverage obtained in using that handle will be on the average in excess of any possible leverage when the operator seizes the steering wheel rim in his hands, and vastly greater than the leverage obtainable when the rotatable handle is permanently positioned inside of the steering wheel rim.

While I have shown the carrier for the handle as encircling the supporting table with flanges entering the grooves of the supporting table, it is obvious that the position of these parts may be reversed while maintaining their full effectiveness. That is, the carrier may have an annular table, outwardly extending arcuate flanges and grooves which will fit into a stationary table having the arcuate curved extensions and flange edges shown in Fig. 3, as being attached to the carrier.

Also, it is practical and within the scope and intent of my invention to so mount the carrier and the handle thereon that the rotatable knob may be extended in some degree beyond the outer limits of the steering wheel rim, thus increasing still further the leverage which can be employed in the steering action.

I claim:

1. A device for aiding in the operation of steering wheels for automobiles, speed boats and the like, comprising an arcuate base member secured to and about the steering wheel rim between a pair of spokes connected thereto and extending for a considerable distance along the longitudinal arcuate center thereof, arcuate grooves and an intervening flat arcuate table forming a guideway on said member, a piece removably mounted upon the lower end of the base member so as to block the grooves, means on the upper end of the base member permanently blocking said grooves, a carrier having extended arcuate portions cooperating with said arcuate grooves to be moved circularly along them and to be limited in that movement by the groove-blocking parts, a palm-contactable handle rotatably mounted on said carrier, and clips on the groove-blocking parts for engagement with cooperative parts of the carrier to hold the carrier against displacement in either its upper or lateral positions, whereby said handle may be swung to an outward position so as to have its axial center extend upwardly at right angles to the plane of the top of the steering wheel rim or to be swung inwardly from said upstanding position to a latched position in the plane of said rim.

2. A device for aiding in the operation of steering wheels of automobiles, speed boats and the like, comprising a frame member having a central portion and two wing portions, the wing portions being adapted to surround and be clamped firmly upon the outer rim of the steering wheel, the central portion having connected therewith an arcuate member with a central opening adapted to receive therein the steering wheel rim, said arcuate member formed with a pair of arcuate grooves, a handle member having a part embracing the arcuate member with inturned arcuate fingers entered within said grooves, and stops in the ends of the grooves, whereby the handle may be swung against one set of stops to be positioned above and in a plane at right angles to the plane of the steering wheel and against the other set of stops to be positioned in the plane of the steering wheel extending inwardly toward the center thereof.

EINAR A. ANDERSON.